US012637060B2

(12) United States Patent
Noma et al.

(10) Patent No.: US 12,637,060 B2
(45) Date of Patent: May 26, 2026

(54) VEHICLE CONTROL APPARATUS, VEHICLE CONTROL METHOD, AND VEHICLE CONTROL SYSTEM

(71) Applicant: Hitachi Astemo, Ltd., Hitachinaka (JP)

(72) Inventors: Daisuke Noma, Hitachinaka (JP); Kentaro Ueno, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 43 days.

(21) Appl. No.: 18/712,769

(22) PCT Filed: Dec. 8, 2022

(86) PCT No.: PCT/JP2022/045276
§ 371 (c)(1),
(2) Date: May 23, 2024

(87) PCT Pub. No.: WO2023/127444
PCT Pub. Date: Jul. 6, 2023

(65) Prior Publication Data
US 2025/0018927 A1 Jan. 16, 2025

(30) Foreign Application Priority Data

Dec. 27, 2021 (JP) ................................. 2021-211970

(51) Int. Cl.
*B60W 30/04* (2006.01)
*B60W 10/184* (2012.01)
*B60W 40/114* (2012.01)

(52) U.S. Cl.
CPC .......... *B60W 30/04* (2013.01); *B60W 10/184* (2013.01); *B60W 40/114* (2013.01); *B60W 2540/18* (2013.01)

(58) Field of Classification Search
CPC .. B60W 30/04; B60W 10/184; B60W 40/114; B60W 2540/18; B60T 8/17554
(Continued)

(56) References Cited

U.S. PATENT DOCUMENTS

2011/0246040 A1* 10/2011 Nakayama .......... B60T 8/17557
701/70
2019/0054916 A1 2/2019 Akiyama et al.
2022/0105809 A1 4/2022 Yamamoto

FOREIGN PATENT DOCUMENTS

CN 101144723 A * 3/2008 ............ B60T 8/3655
CN 101535106 A * 9/2009 ............ B60T 8/1755
(Continued)

OTHER PUBLICATIONS

International Preliminary Report on Patentability (PCT/IB/338 & PCT/IB/373) issued in PCT Application No. PCT/JP2022/045276 dated Jul. 11, 2024, including English translation of Written Opinion (PCT/ISA/237) (11 pages).
(Continued)

*Primary Examiner* — Hai H Huynh
(74) *Attorney, Agent, or Firm* — Crowell & Moring LLP

(57) ABSTRACT

In one mode, with a vehicle control apparatus, a vehicle control method, and a vehicle control system according to the present invention, during roll control based on roll-control driving force and roll-control braking force applied to road wheels of a vehicle, deceleration braking force is allocated such that first deceleration braking force applied to a turning outer front road wheel becomes greater than second deceleration braking force applied to a turning inner front road wheel and third deceleration braking force applied to a turning outer rear road wheel and becomes equal to or greater than fourth deceleration braking force applied to a turning inner rear road wheel. In this way, the roll behavior of the vehicle can be reduced, and the dive behavior toward the turning outer front road wheel can be reduced.

13 Claims, 10 Drawing Sheets

(58) Field of Classification Search
USPC ............................................. 701/48, 70, 72
See application file for complete search history.

(56) References Cited

FOREIGN PATENT DOCUMENTS

| DE | 102018220850 A1 | * | 6/2020 | .............. B60T 13/74 |
|----|-----------------|---|--------|--------------------------|
| JP | 3573382 B2 | * | 10/2004 | .............. B62D 6/00 |
| JP | 2005-306284 A | | 11/2005 | |
| JP | 2005-312190 A | | 11/2005 | |
| JP | 2007-131212 A | | 5/2007 | |
| JP | 2009-184575 A | | 8/2009 | |
| JP | 2011079353 A | * | 4/2011 | ................ B60T 8/17 |
| JP | 2011207423 A | * | 10/2011 | ............ B60W 30/00 |
| JP | 5007775 B2 | * | 8/2012 | ............ B62D 6/003 |
| JP | 2017-190013 A | | 10/2017 | |
| JP | 2019137091 A | * | 8/2019 | ........... B60T 8/1765 |
| JP | 2020-117216 A | | 8/2020 | |

OTHER PUBLICATIONS

International Search Report (PCT/ISA/210) issued in PCT Application No. PCT/JP2022/045276 dated Feb. 28, 2023 with English translation (5 pages).
Japanese-language Written Opinion (PCT/ISA/237) issued in PCT Application No. PCT/JP2022/045276 dated Feb. 28, 2023 with English translation (7 pages).

* cited by examiner

JACK-UP FORCE Fjup = F·tan θ

VEHICLE CONTROL APPARATUS, VEHICLE CONTROL METHOD, AND VEHICLE CONTROL SYSTEM

TECHNICAL FIELD

The present invention relates to a vehicle control apparatus, a vehicle control method, and a vehicle control system.

BACKGROUND ART

Patent Document 1 discloses a behavior control apparatus for a vehicle. This behavior control apparatus includes a requested vehicle braking force acquisition unit that acquires requested vehicle braking force, which is a requested value of the braking force applied to the vehicle, and includes a roll control unit that controls the rolling motion of the vehicle by adjusting the allocation ratio of the braking forces applied to the target road wheels including at least one of the turning inner rear road wheel and the turning outer front road wheel of the vehicle when the vehicle makes a turn and the braking force is applied to the vehicle in response to the requested vehicle braking force.

REFERENCE DOCUMENT LIST

Patent Document

Patent Document 1: JP 2020-117216 A

SUMMARY OF THE INVENTION

Problem to be Solved by the Invention

When a vehicle makes a turn, the vehicle may execute roll control to generate an anti-roll moment and to reduce the roll behavior of the vehicle by applying driving and braking forces to road wheels of the vehicle without longitudinal acceleration, and improvements in ride quality, etc., may be expected for occupants.

During this roll control, however, if deceleration braking force is applied to each road wheel in response to a vehicle deceleration request, the turning outer front road wheel of the pair of right and left front road wheels experiences dive behavior. As a result, the occupant may become unsteady and may have difficulties in keeping seated posture.

The present invention has been made in view of conventional circumstances, and it is an object of the present invention to provide a vehicle control apparatus, a vehicle control method, and a vehicle control system that can reduce, when a vehicle is in a turning and braking state, the roll behavior of the vehicle and the dive behavior toward the turning outer front road wheel.

Means for Solving the Problem

According to the present invention, in one mode, when roll control is executed on a vehicle based on driving and braking forces applied to road wheels of the vehicle, a braking force control command is output such that first deceleration braking force applied to a turning outer front road wheel of the vehicle becomes greater than second deceleration braking force applied to a turning inner front road wheel of the vehicle and third deceleration braking force applied to a turning outer rear road wheel of the vehicle and becomes equal to or greater than fourth deceleration braking force applied to a turning inner rear road wheel of the vehicle.

According to the present invention, the turning outer front road wheel of a vehicle is, between the right and left front road wheels, a front road wheel located on the turning outside when the vehicle makes a turn. In other words, the turning outer front road wheel is a front road wheel located on the far side from the center of the turning circle. The turning inner front road wheel is, between the front road wheels, a front road wheel located on the turning inside when the vehicle makes a turn. In other words, the turning inner front road wheel is a front road wheel located on the near side from the center of the turning circle.

Similarly, according to the present invention, the turning outer rear road wheel is, between the right and left rear road wheels, a rear road wheel located on the turning outside when the vehicle makes a turn. In other words, the turning outer rear road wheel is a rear road wheel located on the far side from the center of the turning circle. The turning inner rear road wheel is, between the rear road wheels, a rear road wheel located on the turning inside when the vehicle makes a turn. In other words, the turning inner rear road wheel is a rear road wheel located on the near side from the center of the turning circle.

Effects of the Invention

According to the present invention, when a vehicle makes a turn and braking, the roll behavior of the vehicle can be reduced, and the dive behavior toward the turning outer front road wheel can be reduced.

MODE FOR CARRYING OUT THE INVENTION

Hereinafter, an example of a vehicle control apparatus, a vehicle control method, and a vehicle control system according to the present invention will be described with reference to the accompanying drawings.

Figure 1:
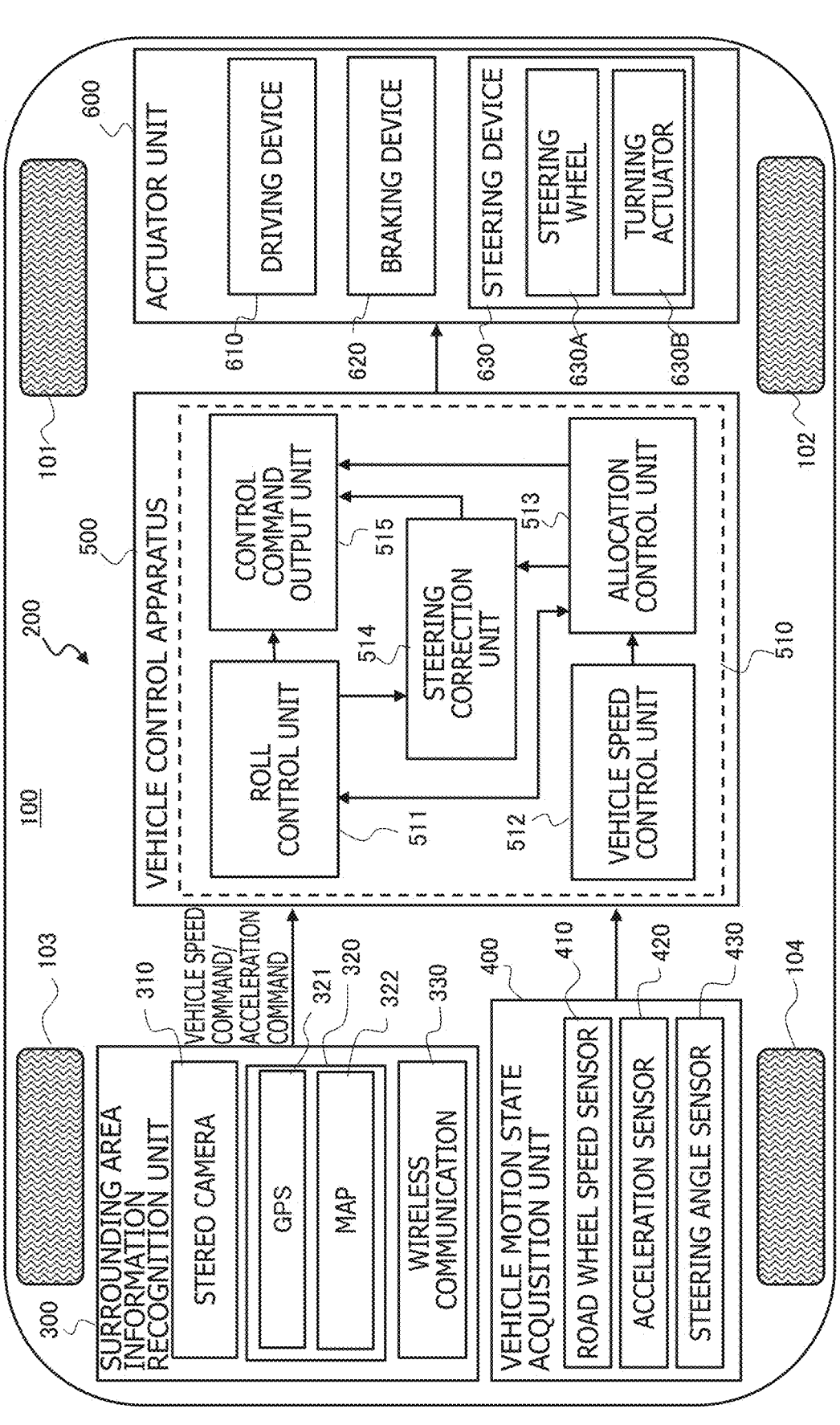
FIG. 1 is a block diagram illustrating a vehicle control system.

FIG. 1 is a block diagram illustrating a mode of a vehicle control system 200 mounted in a vehicle 100.

Vehicle control system 200 is a system for providing vehicle 100 with driver assistance such as for automated driving.

Vehicle 100 is a four-wheeled automobile having a pair of right and left front road wheels 102 and 101 and a pair of right and left rear road wheels 104 and 103.

Vehicle control system 200 includes a surrounding area information recognition unit 300, a vehicle motion state acquisition unit 400, a vehicle control apparatus 500, and an actuator unit 600.

Surrounding area information recognition unit 300 is an apparatus for acquiring and recognizing information about the surrounding area of vehicle 100. Surrounding area information recognition unit 300 outputs the acquired and recognized surrounding area information, and calculates and outputs a vehicle speed command, an acceleration command, etc., used in automated driving, based on the surrounding area information.

In one mode, surrounding area information recognition unit 300 includes a stereo camera 310, a navigation device 320, a wireless communication device 330, etc.

Stereo camera 310 captures an image of the surrounding area of vehicle 100, acquires image information about the surrounding area of vehicle 100, and measures the distance to a target object based on a triangulation method.

Navigation device 320 includes a global positioning system or global positioning satellite (GPS) reception unit 321 and a map database 322.

GPS reception unit 321 measures the latitude and longitude of the location of vehicle 100 by receiving signals from GPS satellites.

Map database 322 is configured in a storage device mounted in vehicle 100.

The map information in map database 322 includes information about road locations, road shapes, intersection locations, etc.

Navigation device 320 refers to map database 322 based on the information about the location of vehicle 100 measured by GPS reception unit 321, determines the road on which vehicle 100 is running, and sets a route to the destination of vehicle 100.

Wireless communication device 330 is a device for performing a road-to-vehicle communication and/or a vehicle-to-vehicle communication.

The road-to-vehicle communication is a wireless communication between vehicle 100 and a roadside device installed on a traveling road, and the vehicle-to-vehicle communication is a wireless communication between vehicle 100 and another vehicle.

When performing the road-to-vehicle communication, wireless communication device 330 transmits information about vehicle 100 such as the speed and the traveling location of vehicle 100 to a roadside device, and receives road traffic information such as about curves and intersections and information about other vehicles from the roadside device.

When performing the vehicle-to-vehicle communication, wireless communication device 330 transmits information about vehicle 100 to another vehicle, and receives information about another vehicle from this vehicle.

Vehicle motion state acquisition unit 400 is a device for acquiring information about the motion state of vehicle 100.

In one mode, vehicle motion state acquisition unit 400 includes a road wheel speed sensor 410, an acceleration sensor 420, and a steering angle sensor 430.

Road wheel speed sensor 410 is a sensor that detects the rotation speed of each of road wheels 101, 102, 103, and 104 of vehicle 100. The detection result of road wheel speed sensor 410 is used for an operation for estimating the speed of vehicle 100.

Acceleration sensor 420 detects the longitudinal acceleration, the lateral acceleration, and the vertical acceleration of vehicle 100, for example.

Steering angle sensor 430 detects the steering angle of front road wheels 101 and 102 turned by a steering device 630, which will be described below. In other words, steering angle sensor 430 detects the tire turning angle.

In one mode, actuator unit 600 includes a driving device 610, which is a driving unit that applies driving force to the drive road wheels to vehicle 100, a braking device 620, which is a braking unit that applies braking force to road wheels 101, 102, 103, and 104 of vehicle 100, and steering device 630 that changes the steering angle of front road wheels 101 and 102.

For example, driving device 610 applies driving force to front road wheels 101 and 102 or to rear road wheels 103 and 104, that is, realizes front wheel drive or rear wheel drive. Driving device 610 includes an internal combustion engine or a motor capable of electrically controlling the output torque.

In addition, driving device 610 may include an in-wheel motor in each of road wheels 101, 102, 103, and 104, and may individually adjust the driving forces applied to road wheels 101, 102, 103, and 104.

Braking device 620 is a hydraulic braking device that includes, for example, a hydraulic energy source and that can individually adjust the braking forces applied to road wheels 101, 102, 103, and 104 by adjusting the hydraulic pressure applied to the brake cylinder of each of road wheels 101, 102, 103, and 104.

For example, braking device 620 may be an electrically operated braking device that uses electric actuators to press brake pads to rotors.

For example, steering device 630 includes a steering wheel 630A, which is a steering operation input member operated by the driver, and includes a turning actuator 630B, which generates turning force that turns front road wheels 101 and 102.

Steering device 630 may be a system in which steering wheel 630A is mechanically coupled to front road wheels 101 and 102, or may be a steer-by-wire system in which steering wheel 630A is mechanically separated from front road wheels 101 and 102.

Vehicle control apparatus 500 is an electronic control unit including a microcomputer 510 as a control part that outputs a result obtained by an operation based on acquired information.

Microcomputer 510 includes a microprocessor unit (MPU), a read-only memory (ROM), and a random access memory (RAM), etc., which are not illustrated in FIG. 1.

Microcomputer 510 acquires, from surrounding area information recognition unit 300 and vehicle motion state acquisition unit 400, various kinds of information, calculates control commands for activating actuator unit 600 based on the acquired information, and outputs the calculated control commands to actuator unit 600.

That is, microcomputer 510 has a function of controlling the driving force, the braking force, and the steering angle (or the turning torque or the steering assist torque), based on the information acquired from surrounding area information recognition unit 300 and vehicle motion state acquisition unit 400.

Microcomputer 510 has a function of reducing the roll behavior caused by turn of vehicle 100 and reducing the dive behavior toward the turning outer front road wheel caused by braking during the turn, by controlling the driving force, the braking force, and the steering angle.

To realize this function, microcomputer 510 includes various functional units, which are a roll control unit 511, a vehicle speed control unit 512, an allocation control unit 513, a steering correction unit 514, and a control command output unit 515.

Roll control unit 511 executes roll control for reducing the roll behavior of vehicle 100 when vehicle 100 turns, by controlling the driving and braking forces applied to road wheels 101, 102, 103, and 104 of vehicle 100.

That is, roll control unit 511 controls the driving and braking forces applied to road wheels 101, 102, 103, and 104 without longitudinal acceleration. In this way, roll control unit 511 generates an anti-roll moment against the roll moment applied to vehicle 100 when vehicle 100 turns.

By generating this anti-roll moment, increase in roll angle by turn of vehicle 100 is reduced, and ride quality for an occupant in vehicle 100 can be improved.

Hereinafter, the roll control executed by roll control unit 511 will be described in detail.

Figure 2:
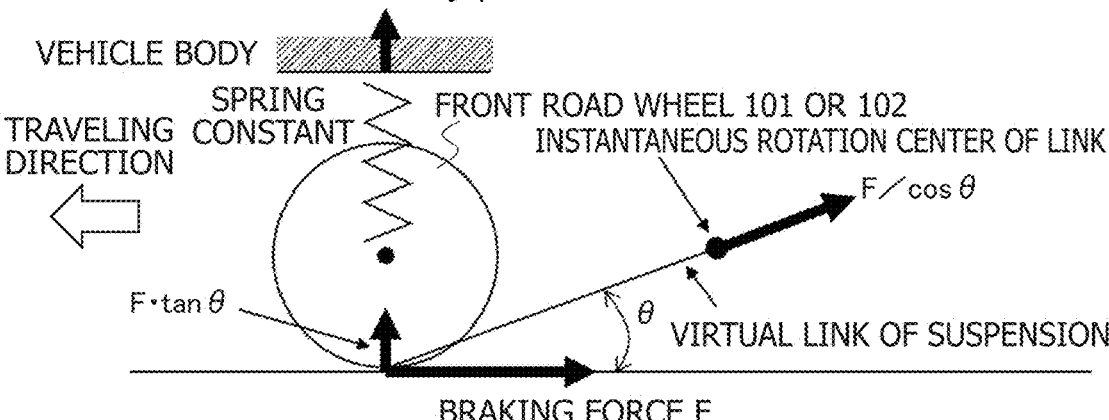
FIG. 2 illustrates a case in which jack-up force is applied to front road wheels when braking force is applied to the front road wheels.

FIG. 2 illustrates a case in which a jack-up force Fjup is applied to front road wheels 101 and 102 when a braking force F is applied to front road wheels 101 and 102 of vehicle 100.

The left side in FIG. 2 corresponds to the front side (in other words, the traveling direction) of vehicle 100, and the instantaneous rotation center of the link of front road wheels 101 and 102 is behind front road wheels 101 and 102 of vehicle 100.

Assuming that the angle made by a line, which connects the instantaneous rotation center of the link of front road wheels 101 and 102 and a contact point of front road wheel 101 or 102 and the ground, and a horizontal line is θ, a compression force F/cos θ is applied to the virtual link of the suspension by braking force F.

In addition, as a component force of compression force F/cos θ, jack-up force Fjup (Fjup=F·tan θ) raising the vehicle body is applied to front road wheels 101 and 102 to which braking force F is applied.

If driving force in the direction opposite to that of the braking force is applied to front road wheels 101 and 102, tension is added to the virtual link, and a jack-down force Fjdw lowering the vehicle body is applied as a component force of the tension.

The instantaneous rotation center of the link of rear road wheels 103 and 104 is on the front side of rear road wheels 103 and 104 of vehicle 100.

Thus, contrary to the case with front road wheels 101 and 102, jack-down force Fjdw lowering the vehicle body is applied to rear road wheels 103 and 104 when the braking force is applied to rear road wheels 103 and 104, and jack-up force Fjup raising the vehicle body is applied to rear road wheels 103 and 104 when the driving force is applied to rear road wheels 103 and 104.

Thus, roll control unit 511 can selectively apply jack-up force Fjup or jack-down force Fjdw to each of road wheels 101, 102, 103, and 104, depending on the application of the braking force or the driving force to each of road wheels 101, 102, 103, and 104.

Roll control unit 511 applies driving and braking forces to road wheels 101, 102, 103, and 104 without longitudinal acceleration, and consequently applies jack-up force Fjup or jack-down force Fjdw to road wheels 101, 102, 103, and 104. In this way, roll control unit 511 generates an anti-roll moment against the roll moment caused by a turn.

Figure 3:
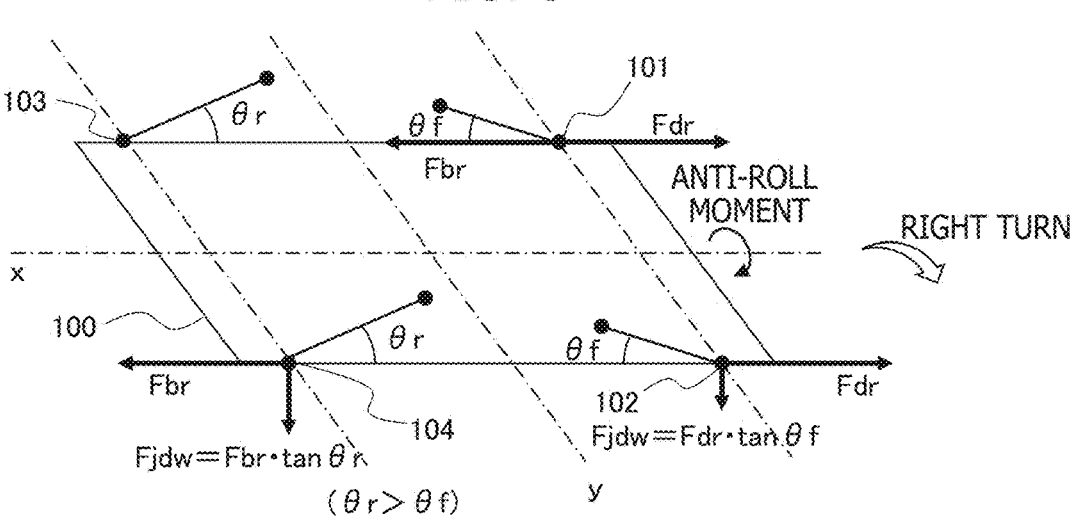
FIG. 3 illustrates roll control executed on a front-wheel-drive vehicle turning right.

FIG. 3 illustrates a mode of a method in which roll control unit 511 applies an anti-roll moment to vehicle 100 by individually controlling the driving and braking forces applied to road wheels 101, 102, 103, and 104.

Vehicle 100 to which a driving and braking force control pattern in FIG. 3 is applied is a front-wheel-drive vehicle of which left front road wheel 101 and right front road wheel 102 are coupled to each other via a drive axle, and driving device 610 applies driving force to right and left front road wheels 102 and 101.

The driving and braking force control pattern in FIG. 3 is a control pattern executed on vehicle 100 turning right. In this control pattern, roll control unit 511 applies, to vehicle 100, an anti-roll moment that lowers the right side of the vehicle body of vehicle 100 compared with the left side thereof.

In the driving and braking force control pattern in FIG. 3, roll control unit 511 outputs a control command for applying a roll-control driving force Fdr to left front road wheel 101 and right front road wheel 102, which are the drive road wheels, and outputs a control command for applying a roll-control braking force Fbr matching roll-control driving force Fdr to left front road wheel 101, which is the turning outer front road wheel, and to right rear road wheel 104, which is the turning inner rear road wheel.

When vehicle 100 makes a left turn, roll control unit 511 outputs these driving and braking force control commands such that the driving and braking force control pattern in FIG. 3 is reversed between right and left.

That is, when roll control unit 511 executes the roll control on a front-wheel-drive vehicle, roll control unit 511 applies a first roll-control driving force to the turning inner front road wheel, applies a first roll-control braking force matching the first roll-control driving force to the turning inner rear road wheel, and applies a second roll-control driving force and a second roll-control braking force matching the second roll-control driving force to the turning outer front road wheel.

When roll control unit 511 applies the driving and braking force to road wheels 101, 102, 103, and 104 as illustrated in FIG. 3, since roll-control driving force Fdr is applied to right front road wheel 102, which is the turning inner front road wheel, jack-down force Fjdw (Fjdw=Fdr·tan θf) is applied.

In addition, roll-control driving force Fdr and roll-control braking force Fbr matching roll-control driving force Fdr are applied to left front road wheel 101, which is the turning outer front road wheel. Because roll-control braking force Fbr and roll-control driving force Fdr are offset, neither jack-down force Fjdw nor jack-up force Fjup is applied to left front road wheel 101.

In addition, since roll-control braking force Fbr is applied to right rear road wheel 104, which is the turning inner rear road wheel, jack-down force Fjdw (Fjdw=Fbr·tan θr) is applied to right rear road wheel 104.

In addition, since neither roll-control braking force Fbr nor roll-control driving force Fdr is applied to left rear road wheel 103, which is the turning outer rear road wheel, neither jack-down force Fjdw nor jack-up force Fjup is applied to left rear road wheel 103.

That is, in the driving and braking state illustrated in FIG. 3, neither jack-down force Fjdw nor jack-up force Fjup is applied to left front road wheel 101 and left rear road wheel 103, which are the turning outer road wheels.

However, jack-down force Fjdw is applied to right front road wheel 102, which is a turning inner road wheel, and jack-down force Fjdw is also applied to right rear road wheel 104, which is also a turning inner road wheel.

As a result, a roll moment lowering the right side of the vehicle body of vehicle 100 compared to the left side thereof, that is, an anti-roll moment against the roll moment lifting the right side of vehicle 100, the right side corresponding to the turning inner side when vehicle 100 makes a right turn, is applied to vehicle 100.

Thus, when vehicle 100 makes a right turn, increase in roll angle, in other words, roll behavior, is reduced, and ride quality, etc., for an occupant in vehicle 100 are improved.

In addition, since roll control unit 511 applies roll-control driving force Fdr and roll-control braking force Fbr to left front road wheel 101, applies roll-control driving force Fdr to right front road wheel 102, and applies roll-control braking force Fbr to right rear road wheel 104, roll-control driving force Fdr and roll-control braking force Fbr balance out on each of the right side and the left side of vehicle 100.

Thus, roll control unit 511 can reduce the roll behavior caused by turn of vehicle 100 without longitudinal acceleration.

In this case, as turn of the vehicle generates a greater roll moment or roll angle, roll control unit 511 generates a greater anti-roll moment by increasing roll-control driving force Fdr and roll-control braking force Fbr.

For example, roll control unit 511 can set roll-control driving force Fdr and roll-control braking force Fbr, based on the lateral acceleration, the lateral jerk, the roll angle, the time rate of change of the roll angle, etc.

Figure 4:
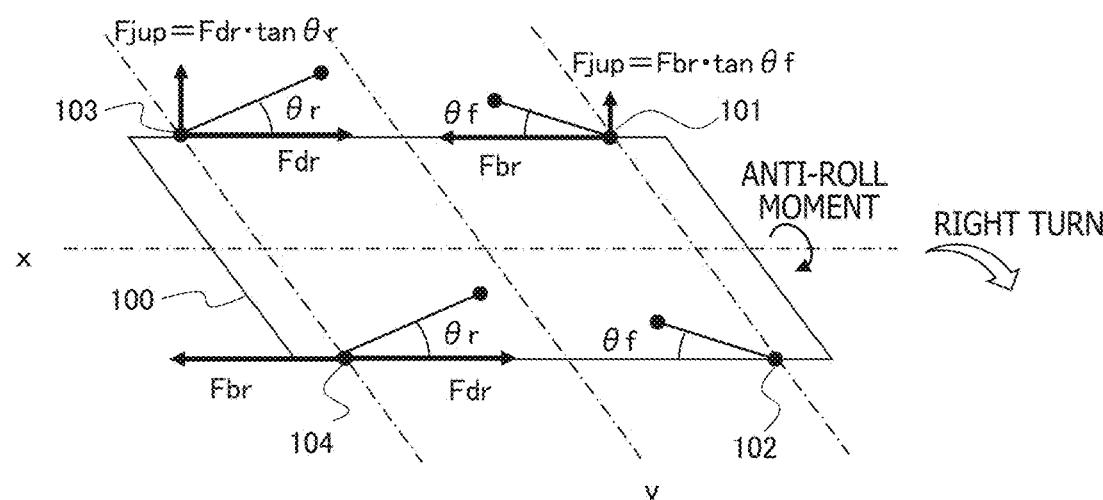
FIG. 4 illustrates roll control executed on a rear-wheel-drive vehicle turning right.

FIG. 4 illustrates a mode of a method in which roll control unit 511 applies an anti-roll moment to vehicle 100, which is a rear-wheel-drive vehicle, when vehicle 100 makes a right turn. In vehicle 100, left rear road wheel 103 and right rear road wheel 104 are coupled to each other via a drive axle, and driving device 610 applies driving force to right and left rear road wheels 104 and 103.

In a driving and braking force control pattern in FIG. 4, roll control unit 511 outputs a control command for applying roll-control driving force Fdr to left rear road wheel 103 and right rear road wheel 104, which are the drive road wheels.

In addition, roll control unit 511 outputs a control command for applying roll-control braking force Fbr matching roll-control driving force Fdr to left front road wheel 101, which is the turning outer front road wheel, and to right rear road wheel 104, which is the turning inner rear road wheel.

When rear-wheel-drive vehicle 100 makes a left turn, roll control unit 511 outputs these driving and braking force control commands such that the driving and braking force control pattern in FIG. 4 is reversed between right and left.

That is, when roll control unit 511 executes the roll control on a rear-wheel-drive vehicle, roll control unit 511 applies the first roll-control driving force and the first roll-control braking force matching the first roll-control driving force to the turning inner rear road wheel, applies the second roll-control braking force to the turning outer front road wheel, and applies the second roll-control driving force matching the second roll-control braking force to the turning outer rear road wheel.

As a result of this roll control, jack-up force Fjup is applied to the turning outer front and rear road wheels of vehicle 100, and an anti-roll moment against the roll moment caused when vehicle 100 turns is consequently applied to vehicle 100.

Figure 5:
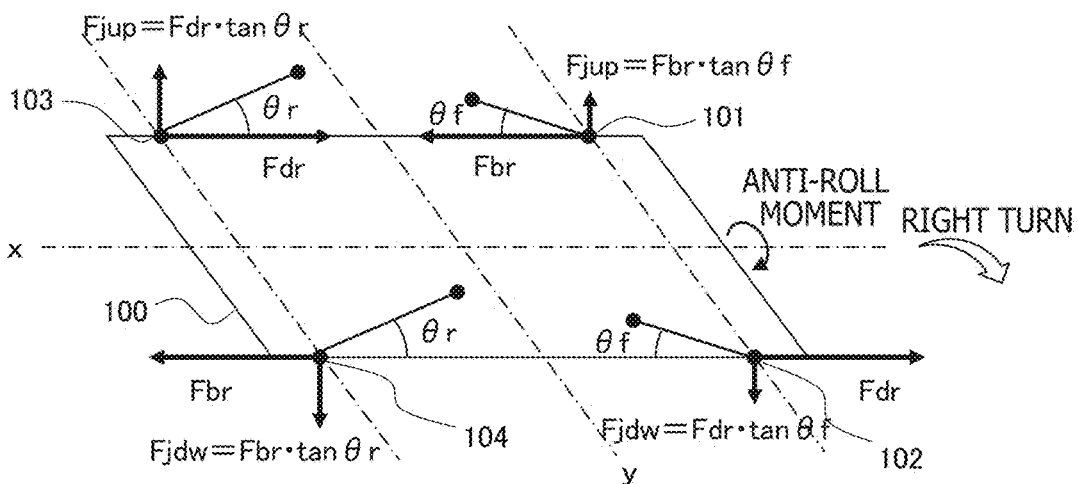
FIG. 5 illustrates roll control executed on an in-wheel motor vehicle turning right.

FIG. 5 illustrates a mode of a method in which when vehicle 100 makes a right turn, roll control unit 511 applies an anti-roll moment to vehicle 100 including driving device 610 having an in-wheel motor in each of road wheels 101, 102, 103, and 104.

In this driving and braking force control pattern in FIG. 5, roll control unit 511 outputs a control command for applying roll-control driving force Fdr to right front road wheel 102, which is the turning inner front road wheel, and to left rear road wheel 103, which is the turning outer rear road wheel. In addition, roll control unit 511 outputs a control command for applying roll-control braking force Fbr matching roll-control driving force Fdr to left front road wheel 101, which is the turning outer front road wheel, and to right rear road wheel 104, which is the turning inner rear road wheel.

When vehicle 100 makes a left turn, roll control unit 511 outputs these driving force and braking force control commands such that the driving and braking force control pattern in FIG. 5 is reversed between right and left.

That is, when roll control unit 511 executes the roll control on vehicle 100 including an in-wheel motor in each of the road wheels, roll control unit 511 applies the first roll-control driving force to the turning inner front road wheel, applies the first roll-control braking force matching the first roll-control driving force to the turning inner rear road wheel, applies the second roll-control braking force to the turning outer front road wheel, and applies the second roll-control driving force matching the second roll-control braking force to the turning outer rear road wheel.

As a result of this roll control, jack-up force Fjup is applied to the turning outer front and rear road wheels of vehicle 100, and jack-down force Fjdw is applied to the turning inner front and rear road wheels of vehicle 100. That is, an anti-roll moment against the roll moment caused when vehicle 100 turns is applied to vehicle 100.

When roll control unit 511 is executing the roll control, if deceleration braking force is applied to road wheels 101, 102, 103, and 104 based on a deceleration request, dive behavior toward a turning outer front road wheel occurs. As a result, an occupant may become unsteady and find it difficult to remain seated.

That is, if braking is executed based on a deceleration request during the roll control, the effectiveness of the roll control may be lost.

Thus, when deceleration braking force, which is braking force based on a deceleration request given to vehicle 100, is applied to road wheels 101, 102, 103, and 104 during the roll control, allocation control unit 513 executes allocation control such that greater deceleration braking force is allocated to the turning outer front road wheel. As a result, greater jack-up force Fjup is applied to the turning outer front road wheel, and the dive behavior toward the turning outer front road wheel is reduced.

In this way, when vehicle 100 turns, because roll control unit 511 reduces the roll behavior and allocation control unit 513 reduces the dive behavior toward the turning outer front road wheel, the occupant becomes less unsteady and find it easier to remain seated. In addition, the operability in driving the vehicle is improved.

Specifically, allocation control unit 513 outputs a deceleration braking force control command (in other words, a braking force control command) such that first deceleration braking force applied to the turning outer front road wheel becomes greater than second deceleration braking force applied to the turning inner front road wheel and third deceleration braking force applied to the turning outer rear road wheel and becomes equal to or greater than fourth deceleration braking force applied to the turning inner rear road wheel.

Figure 6:
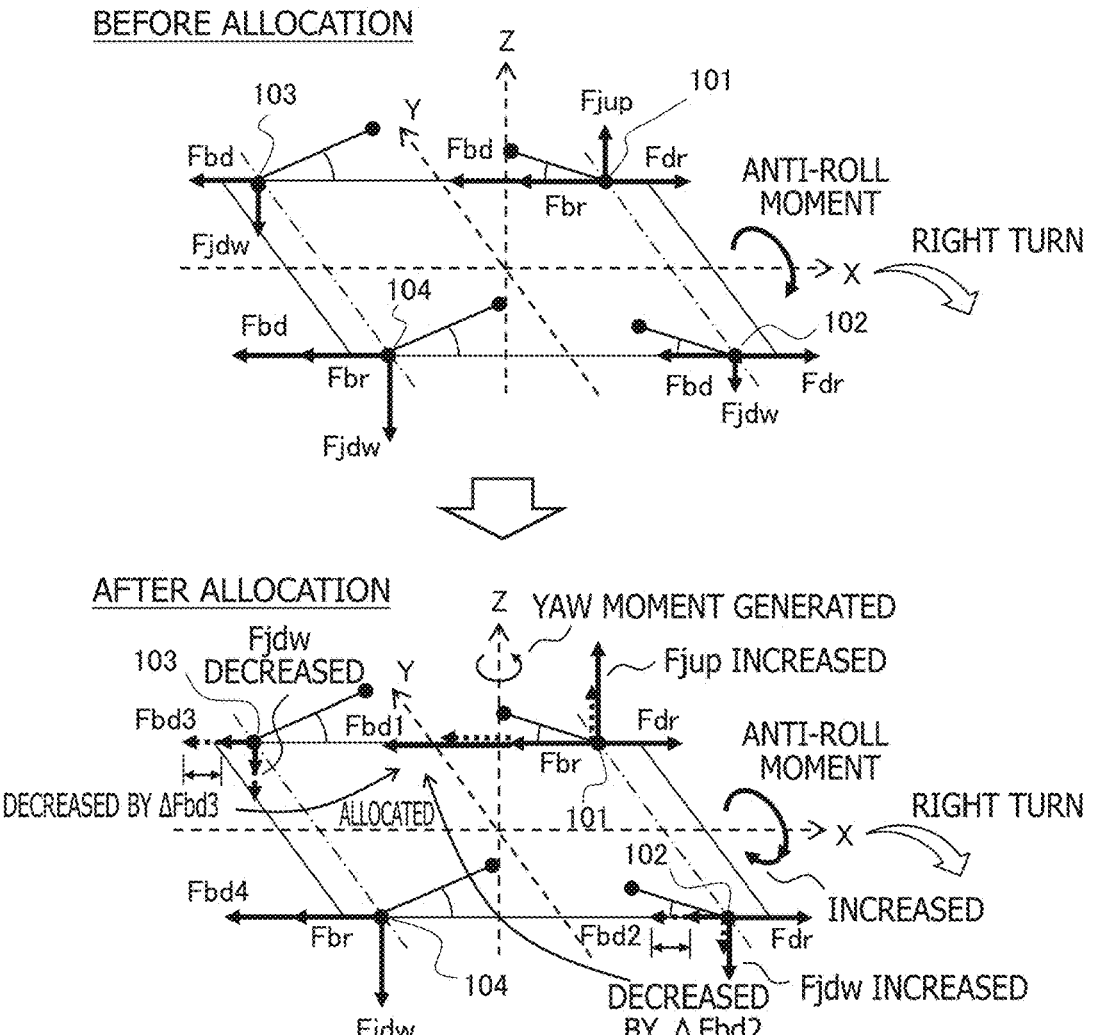
FIG. 6 illustrates deceleration braking force allocation control executed during roll control on a front-wheel-drive vehicle turning right.

FIG. 6 illustrates a mode of deceleration braking force allocation control executed by allocation control unit 513. Specifically, FIG. 6 illustrates deceleration braking force allocation control executed when a deceleration request occurs while roll control unit 511 is executing the roll control on the front-wheel-drive vehicle illustrated in FIG. 3.

The top side in FIG. 6 illustrates a state in which deceleration braking force Fbd is applied to road wheels 101, 102, 103, and 104 based on a deceleration request of vehicle 100 during the roll control illustrated in FIG. 3, in other words, a state before deceleration braking force allocation control is executed by allocation control unit 513.

In the roll control illustrated in FIG. 3, since roll-control braking force Fbr is applied to the turning outer front road wheel and the turning inner rear road wheel, if a deceleration request of vehicle 100 occurs during the roll control, braking force, which is a sum of roll-control braking force Fbr and deceleration braking force Fbd, is applied to the turning outer front road wheel and the turning inner rear road wheel.

In contrast, the bottom side in FIG. 6 illustrates a state in which allocation control unit 513 has executed deceleration braking force allocation control, and a first deceleration braking force Fbd1, a second deceleration braking force Fbd2, a third deceleration braking force Fbd3, and a fourth deceleration braking force Fbd4 have been applied to road wheels 101, 102, 103, and 104, respectively.

Allocation control unit 513 does not execute the allocation control on right rear road wheel 104, which is the turning inner rear road wheel. That is, allocation control unit 513 uses deceleration braking force Fbd applied to right rear road wheel 104 as fourth deceleration braking force Fbd4.

In addition, allocation control unit 513 calculates second deceleration braking force Fbd2 applied to right front road wheel 102, which is the turning inner front road wheel, by subtracting an allocated quantity ΔFbd2 from deceleration braking force Fbd (second deceleration braking force Fbd2=Fbd−ΔFbd2).

Similarly, allocation control unit 513 calculates third deceleration braking force Fbd3 applied to left rear road wheel 103, which is the turning outer rear road wheel, by subtracting an allocated quantity ΔFbd3 from deceleration braking force Fbd (third deceleration braking force Fbd3=Fbd−ΔFbd3).

In addition, allocation control unit 513 calculates first deceleration braking force Fbd1 applied to left front road wheel 101, which is the turning outer front road wheel, by adding allocated quantity ΔFbd2 and allocated quantity ΔFbd3 to deceleration braking force Fbd (first deceleration braking force Fbd1=Fbd+ΔFbd2+ΔFbd3).

That is, in the allocation control, allocation control unit 513 adds allocated quantity ΔFbd2, which is the reduction amount of the deceleration braking force applied to right front road wheel 102, which is the turning inner front road wheel, and allocated quantity ΔFbd3, which is the reduction amount of the deceleration braking force of left rear road wheel 103, which is the turning outer rear road wheel, to the deceleration braking force applied to left front road wheel 101, which is the turning outer front road wheel.

As a result of the allocation control, first deceleration braking force Fbd1 becomes greater than fourth deceleration braking force Fbd4, and fourth deceleration braking force Fbd4 becomes greater than second deceleration braking force Fbd2 and third deceleration braking force Fbd3.

As described above, greater jack-up force Fjup is applied to the turning outer front road wheel by allocating greater deceleration braking force to the turning outer front road wheel than by equally allocating deceleration braking force to all the road wheels.

In addition, greater jack-down force Fjdw is applied to the turning inner front road wheel than that applied by equally allocating deceleration braking force to all the road wheels.

In addition, less jack-down force Fjdw is applied to the turning outer rear road wheel than that applied by equally allocating deceleration braking force to all the road wheel.

By varying jack-up force Fjup and jack-down force Fjdw as described above, a greater anti-roll moment is applied to vehicle 100, and the dive behavior toward the turning outer front road wheel is reduced in a turning and braking state in which vehicle 100 is decelerated during a turn.

Allocation control unit 513 can also reduce the dive behavior toward the turning outer front road wheel of a rear-wheel-drive vehicle or an in-wheel motor vehicle by executing the allocation control, that is, by allocating the reduction amount of the deceleration braking force applied to the turning inner front road wheel and the turning outer rear road wheel to the turning outer front road wheel.

Figure 7:
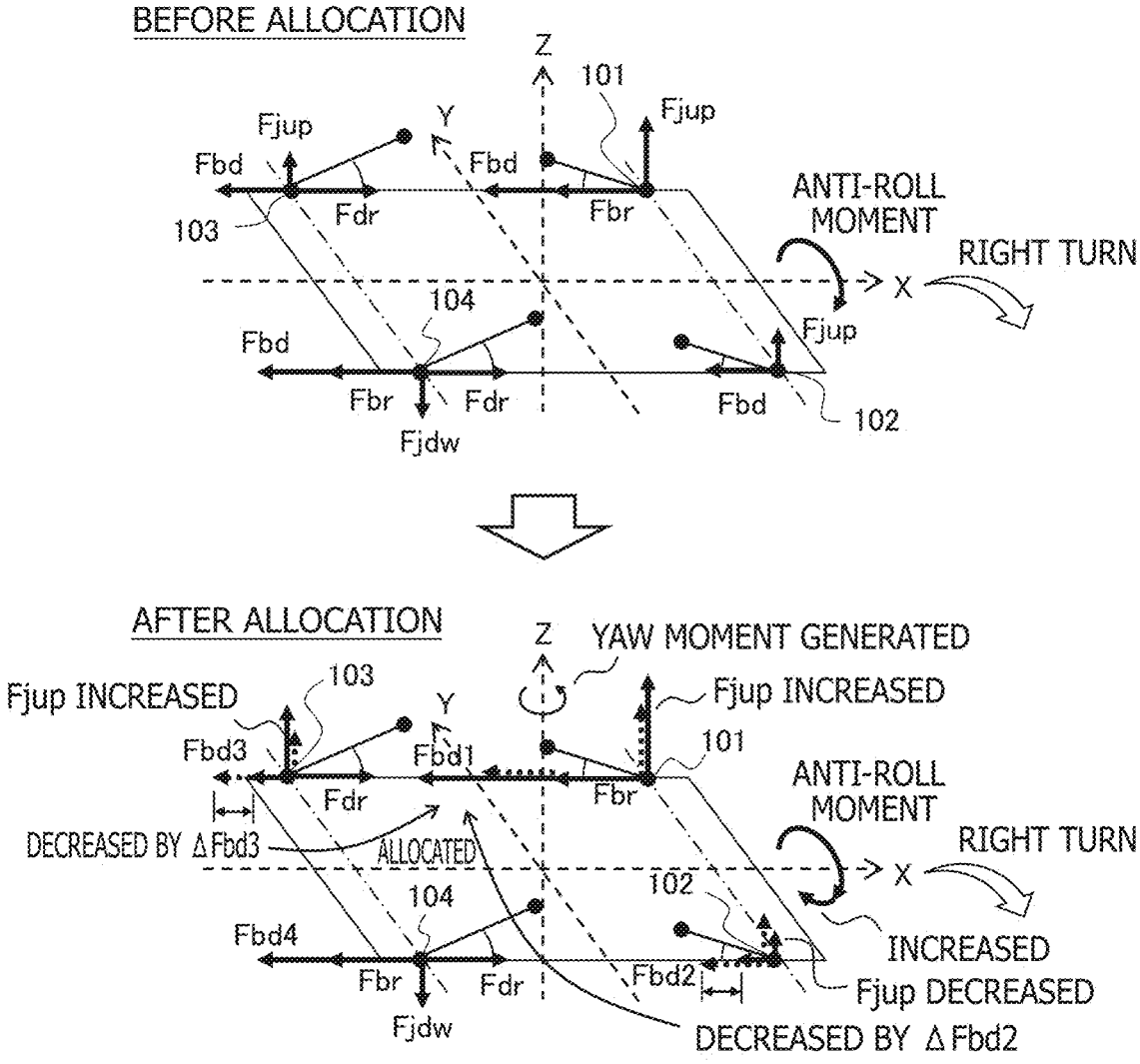
FIG. 7 illustrates deceleration braking force allocation control executed during roll control on a rear-wheel-drive vehicle turning right.

FIG. 7 illustrates deceleration braking force allocation control executed on a rear-wheel-drive vehicle.

Roll control unit 511 executes the roll control on a rear-wheel-drive vehicle as illustrated in FIG. 4.

Thus, in the pre-allocation state illustrated in the top side in FIG. 7, a sum of roll-control braking force Fbr and deceleration braking force Fbd is applied to left front road wheel 101, which is the turning outer front road wheel, and to right rear road wheel 104, which is the turning inner rear road wheel.

In addition, deceleration braking force Fbd, not roll-control braking force Fbr, is applied to left rear road wheel 103, which is the turning outer rear road wheel, and to right front road wheel 102, which is the turning inner front road wheel.

In this case, as illustrated in the bottom side in FIG. 7, allocation control unit 513 calculates second deceleration braking force Fbd2 applied to the turning inner front road wheel by subtracting allocated quantity ΔFbd2 from deceleration braking force Fbd, calculates third deceleration braking force Fbd3 applied to the turning outer rear road wheel by subtracting allocated quantity ΔFbd3 from deceleration braking force Fbd, and calculates first deceleration braking force Fbd1 applied to the turning outer front road wheel by adding "ΔFbd2+ΔFbd3" to deceleration braking force Fbd.

As a result of this allocation control, first deceleration braking force Fbd1 becomes greater than fourth deceleration braking force Fbd4, and fourth deceleration braking force Fbd4 becomes greater than second deceleration braking force Fbd2 and third deceleration braking force Fbd3.

Thus, the deceleration braking force allocation control reduces the dive behavior toward the turning outer front road wheel.

Figure 8:
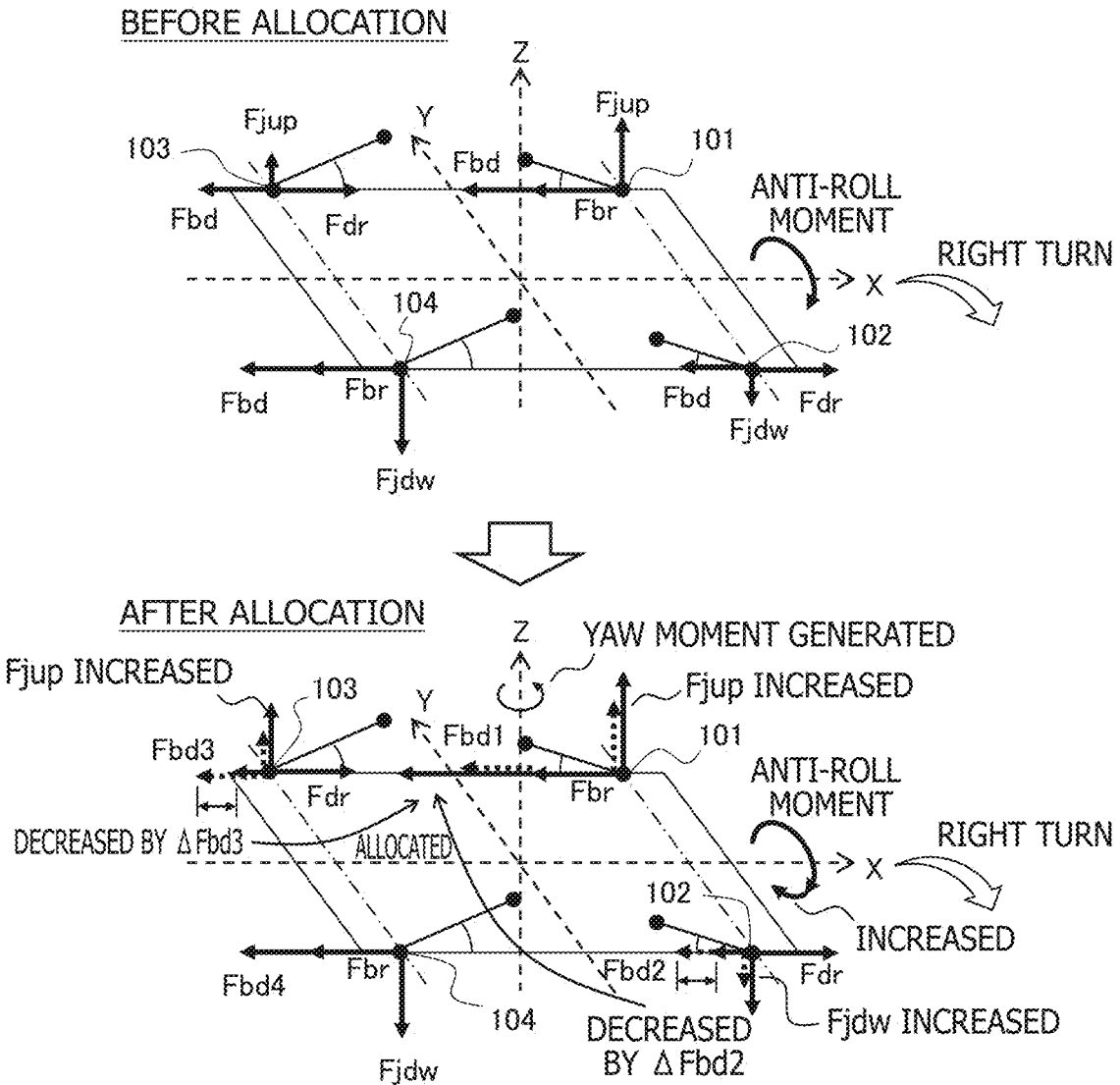
FIG. 8 illustrates deceleration braking force allocation control executed during roll control on an in-wheel motor vehicle turning right.

FIG. 8 illustrates deceleration braking force allocation control executed on an in-wheel motor vehicle.

Roll control unit 511 executes the roll control on an in-wheel motor vehicle as illustrated in FIG. 5.

Thus, in the pre-allocation state illustrated in the top side in FIG. 8, a sum of roll-control braking force Fbr and deceleration braking force Fbd is applied to left front road wheel 101, which is the turning outer front road wheel, and to right rear road wheel 104, which is the turning inner rear road wheel, and deceleration braking force Fbd, not roll-control braking force Fbr, is applied to left rear road wheel 103, which is the turning outer rear road wheel, and to right front road wheel 102, which is the turning inner front road wheel.

In this case, as illustrated in the bottom side in FIG. 8, allocation control unit 513 calculates second deceleration braking force Fbd2 applied to the turning inner front road wheel by subtracting allocated quantity ΔFbd2 from deceleration braking force Fbd, calculates third deceleration braking force Fbd3 applied to the turning outer rear road wheel by subtracting allocated quantity ΔFbd3 from deceleration braking force Fbd, and calculates first deceleration braking force Fbd1 applied to the turning outer front road wheel by adding "ΔFbd2+ΔFbd3" to deceleration braking force Fbd.

As a result of this allocation control, first deceleration braking force Fbd1 becomes greater than fourth deceleration braking force Fbd4, and fourth deceleration braking force Fbd4 becomes greater than second deceleration braking force Fbd2 and third deceleration braking force Fbd3.

Thus, the deceleration braking force allocation control reduces the dive behavior toward the turning outer front road wheel.

Hereinafter, a process for setting allocated quantities ΔFbd2 and ΔFbd3 used for varying deceleration braking force Fbd when allocation control unit 513 allocates greater deceleration braking force to the turning outer front road wheel will be described in detail.

The dive quantity toward the turning outer front road wheel in a turning and braking state is correlated to the longitudinal acceleration and the lateral acceleration of vehicle 100.

Thus, allocation control unit 513 determines allocated quantities ΔFbd2 and ΔFbd3, each of which is a correction amount of deceleration braking force Fbd, based on the longitudinal acceleration or the lateral acceleration of vehicle 100.

Figure 9:
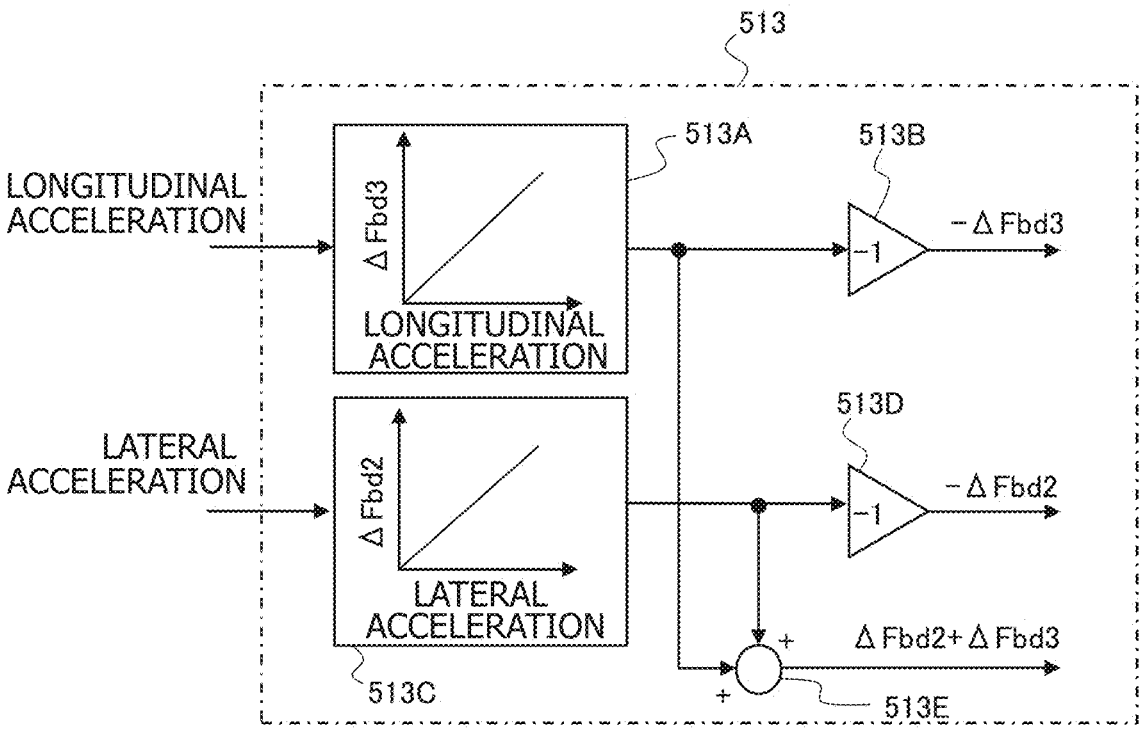
FIG. 9 is a block diagram illustrating functions for setting allocated deceleration braking force quantities.

FIG. 9 is a functional block diagram illustrating a mode of a process for setting allocated quantities ΔFbd2 and ΔFbd3 executed by allocation control unit 513.

Allocation control unit 513 includes various functional units, which are a first allocated quantity setting unit 513A, a first multiplication unit 513B, a second allocated quantity setting unit 513C, a second multiplication unit 513D, and an addition unit 513E.

First allocated quantity setting unit 513A is a functional unit that sets allocated quantity ΔFbd3 that controls the allocation of the deceleration braking forces applied to the turning outer front and rear road wheels.

First allocated quantity setting unit 513A acquires information about the longitudinal acceleration of vehicle 100, sets greater allocated quantity ΔFbd3 (ΔFbd3≥0) for greater longitudinal acceleration, and outputs information about allocated quantity ΔFbd3 to first multiplication unit 513B.

That is, when the longitudinal acceleration is greater and when the dive quantity toward the turning outer front road wheel is greater, first allocated quantity setting unit 513A sets greater allocated quantity ΔFbd3. In this way, third deceleration braking force Fbd3 applied to the turning outer rear road wheel is reduced more, and first deceleration braking force Fbd1 applied to the turning outer front road wheel is relatively increased more.

First multiplication unit 513B multiplies allocated quantity ΔFbd3 set by first allocated quantity setting unit 513A by "−1", to calculate the reduction amount of third deceleration braking force Fbd3 applied to the turning outer rear road wheel.

In addition, allocation control unit 513 determines third deceleration braking force Fbd3 applied to the turning outer rear road wheel from deceleration braking force Fbd, which is the equally allocated amount, and allocated quantity ΔFbd3, which is the reduction amount. That is, allocation control unit 513 calculates "Fbd3=Fbd−ΔFbd3".

Second allocated quantity setting unit 513C is a functional unit that sets allocated quantity ΔFbd2 that controls the allocation of deceleration braking forces applied to the left and right front road wheels.

Second allocated quantity setting unit 513C acquires information about the lateral acceleration of vehicle 100, sets greater allocated quantity ΔFbd2 (ΔFbd2≥0) for greater lateral acceleration, and outputs information about allocated quantity ΔFbd2 to second multiplication unit 513D.

That is, when the lateral acceleration is greater and when the dive quantity toward the turning outer front road wheel is greater, second allocated quantity setting unit 513C reduces second deceleration braking force Fbd2 applied to the turning inner front road wheel more by setting greater allocated quantity ΔFbd2. As a result, first deceleration braking force Fbd1 applied to the turning outer front road wheel is relatively increased more.

Second multiplication unit 513D multiplies allocated quantity ΔFbd2 set by second allocated quantity setting unit 513C by "−1", and sets resultant allocated quantity ΔFbd2 as the reduction amount of second deceleration braking force Fbd2 applied to the turning inner front road wheel.

In addition, allocation control unit 513 determines second deceleration braking force Fbd2 applied to the turning inner front road wheel from deceleration braking force Fbd, which is the equally allocated amount, and allocated quantity ΔFbd2, which is the reduction amount. That is, allocation control unit 513 calculates "Fbd2=Fbd−ΔFbd2".

Addition unit 513E acquires information about allocated quantity ΔFbd3 (ΔFbd3≥0) output by first allocated quantity setting unit 513A, and information about allocated quantity ΔFbd2 (ΔFbd2≥0) output by second allocated quantity setting unit 513C, and sets a sum of allocated quantity ΔFbd3 and allocated quantity ΔFbd2 as the increase amount of first deceleration braking force Fbd1 applied to the turning outer front road wheel.

In addition, allocation control unit 513 determines first deceleration braking force Fbd1 applied to the turning outer front road wheel from deceleration braking force Fbd, which is the equally allocated amount, and the sum of allocated quantity ΔFbd3 and allocated quantity ΔFbd2. That is, allocation control unit 513 calculates "Fbd1=Fbd+(ΔFbd2+ΔFbd3)".

That is, allocation control unit 513 outputs a deceleration braking force control command such that first deceleration braking force Fbd1 applied to the turning outer front road wheel becomes greater as the longitudinal acceleration of vehicle 100 and the lateral acceleration of vehicle 100 become greater.

The information about the longitudinal acceleration acquired by first allocated quantity setting unit 513A and the information about the lateral acceleration acquired by second allocated quantity setting unit 513C may be any of a value detected by acceleration sensor 420, motion states of vehicle 100 (for example, the steering angle, the brake fluid pressure, the driving torque, etc.), estimated values based on vehicle specifications, etc., and command values (in other words, control target values) used for setting operation quantities such as the driving force, the steering angle, the brake fluid pressure, etc., in drive assistance control such as in automated driving.

In addition, allocation control unit 513 can execute a limit process such that allocated first deceleration braking force Fbd1 does not exceed a predetermined braking force limit value.

Figure 10:
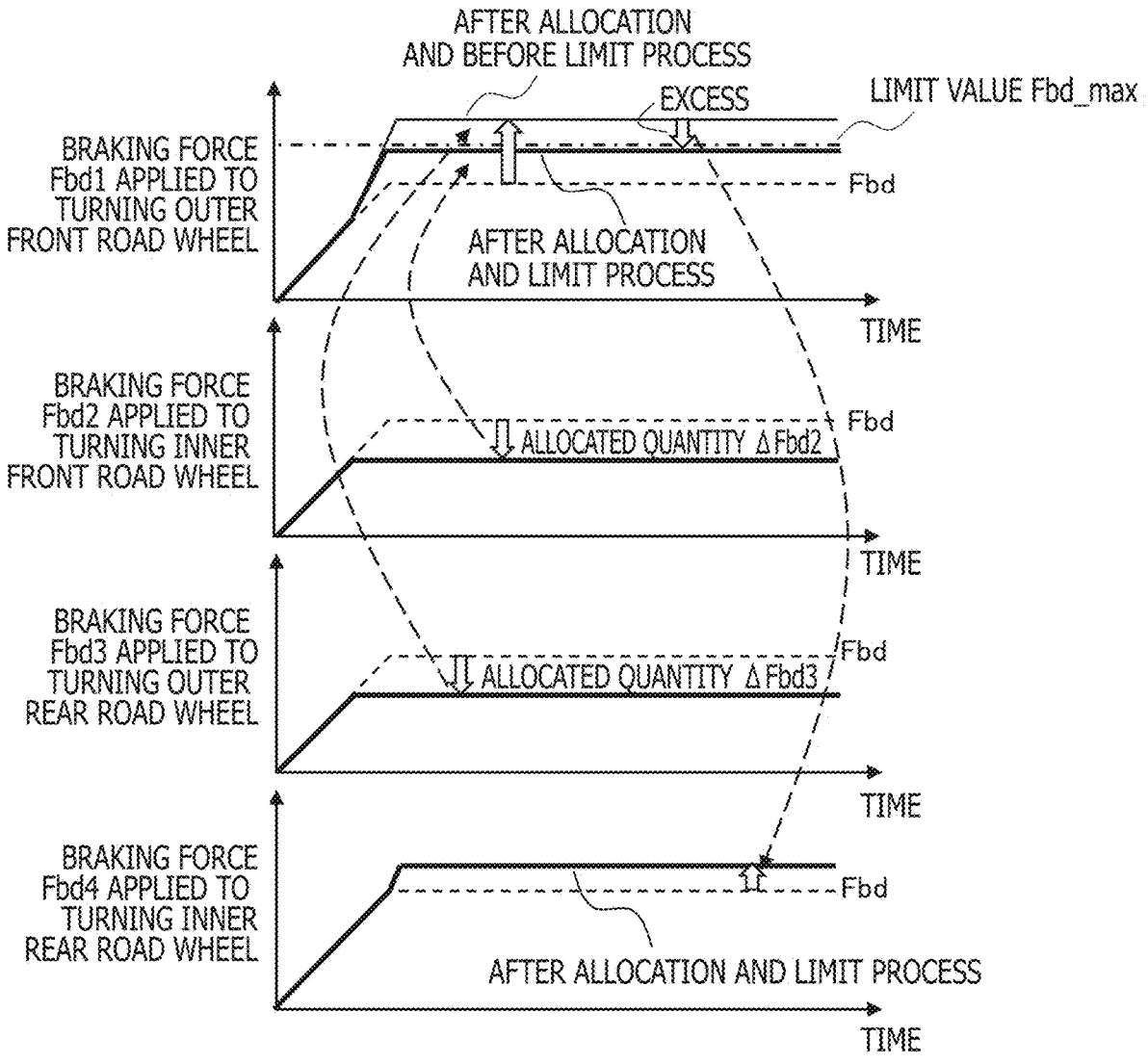
FIG. 10 is a time chart illustrating a limit process on the deceleration braking force applied to a turning outer front road wheel.

FIG. 10 is a time chart illustrating allocation and resetting of deceleration braking forces Fbd1, Fbd2, Fbd3, and Fbd4 when allocation control unit 513 executes a limit process.

If first deceleration braking force Fbd1 increased by allocated quantities ΔFbd3 and ΔFbd2 exceeds a predetermined braking force limit value Fbd_max, allocation control unit 513 may execute the limit process. In this limit process, allocation control unit 513 resets first deceleration braking force Fbd1 to braking force limit value Fbd_max by allocating the excess of first deceleration braking force Fbd1 over braking force limit value Fbd_max to fourth deceleration braking force Fbd4 applied to the turning inner rear road wheel.

In this limit process, allocation control unit 513 can set braking force limit value Fbd_max based on saturated braking force that is based on a friction coefficient μ of the road surface on which vehicle 100 is running. That is, allocation control unit 513 can set smaller braking force limit value Fbd_max for smaller road surface friction coefficient μ.

In addition, although the jack-up quantity of the turning outer front road wheel increases as the braking force applied to the turning outer front road wheel increases, the jack-up quantity saturates when the braking force reaches predetermined braking force.

Thus, when the jack-up quantity applied to the turning outer front road wheel reaches a limit, which is the maximum jack-up quantity generatable, in other words, when first deceleration braking force Fbd1 exceeds braking force limit value Fbd_max based on the limit of the jack-up quantity, allocation control unit 513 can execute the limit process.

When allocation control unit 513 executes the allocation control of deceleration braking forces Fbd1, Fbd2, Fbd3, and Fbd4, a difference is caused in deceleration braking force between the right side and the left side of vehicle 100, and a yaw moment is consequently generated.

Since allocation control unit 513 reduces second deceleration braking force Fbd2 applied to the turning inner front road wheel by allocated quantity ΔFbd2, and adds the reduction amount to first deceleration braking force Fbd1 applied to the turning outer front road wheel, the deceleration braking force applied to the turning outside becomes greater than the deceleration braking force applied to the turning inside. As a result, a yaw moment that orients vehicle 100 to the turning outside opposite to the turning direction of vehicle 100 is generated (see FIGS. 6, 7, and 8).

Thus, although allocation control unit 513 can execute the allocation control of deceleration braking forces Fbd1, Fbd2, Fbd3, and Fbd4, and can reduce the dive behavior toward the turning outer front road wheel, the turning performance of vehicle 100 may deteriorate.

To solve this problem, steering correction unit 514 outputs a control command to steering device 630 such that the yaw moment generated by the allocation control of deceleration braking forces Fbd1, Fbd2, Fbd3, and Fbd4 is offset by steering control.

Specifically, steering correction unit 514 calculates the yaw moment generated by allocated deceleration braking forces Fbd1, Fbd2, Fbd3, and Fbd4, and corrects, based on the calculated yaw moment, a command value of the steering angle of front road wheels 101 and 102, the steering angle of front road wheels 101 and 102 based on the operation angle of steering wheel 630A, or the turning force by turning actuator 630B.

For example, when vehicle 100 is in an automated driving state and when steering device 630 activates turning actuator 630B based on a steering angle command value, steering correction unit 514 corrects the steering angle command value given to steering device 630 such that the yaw moment generated by the deceleration braking force allocation control is offset, specifically, such that the steering angle is increased. Steering correction unit 514 sets a greater steering angle for a greater yaw moment.

In addition, when steering device 630 is a steer-by-wire system, steering correction unit 514 corrects the steering angle of front road wheels 101 and 102 determined based on the operation angle of steering wheel 630A such that the yaw moment generated by the deceleration braking force allocation control is offset, specifically, such that the steering angle becomes greater than the steering angle based on the operation angle of steering wheel 630A. Steering correction unit 514 sets a greater steering angle for a greater yaw moment.

In addition, when steering device 630 assists the driver in operating steering wheel 630A with the turning force generated by turning actuator 630B (in other words, steering assist force), steering correction unit 514 sets greater steering assist force for a greater yaw moment.

That is, steering correction unit 514 assists the driver's steering operation such that the yaw moment generated by the deceleration braking force allocation control is offset, that is, such that the current tire turning angle increases, by increasing the steering assist force.

Figure 11:
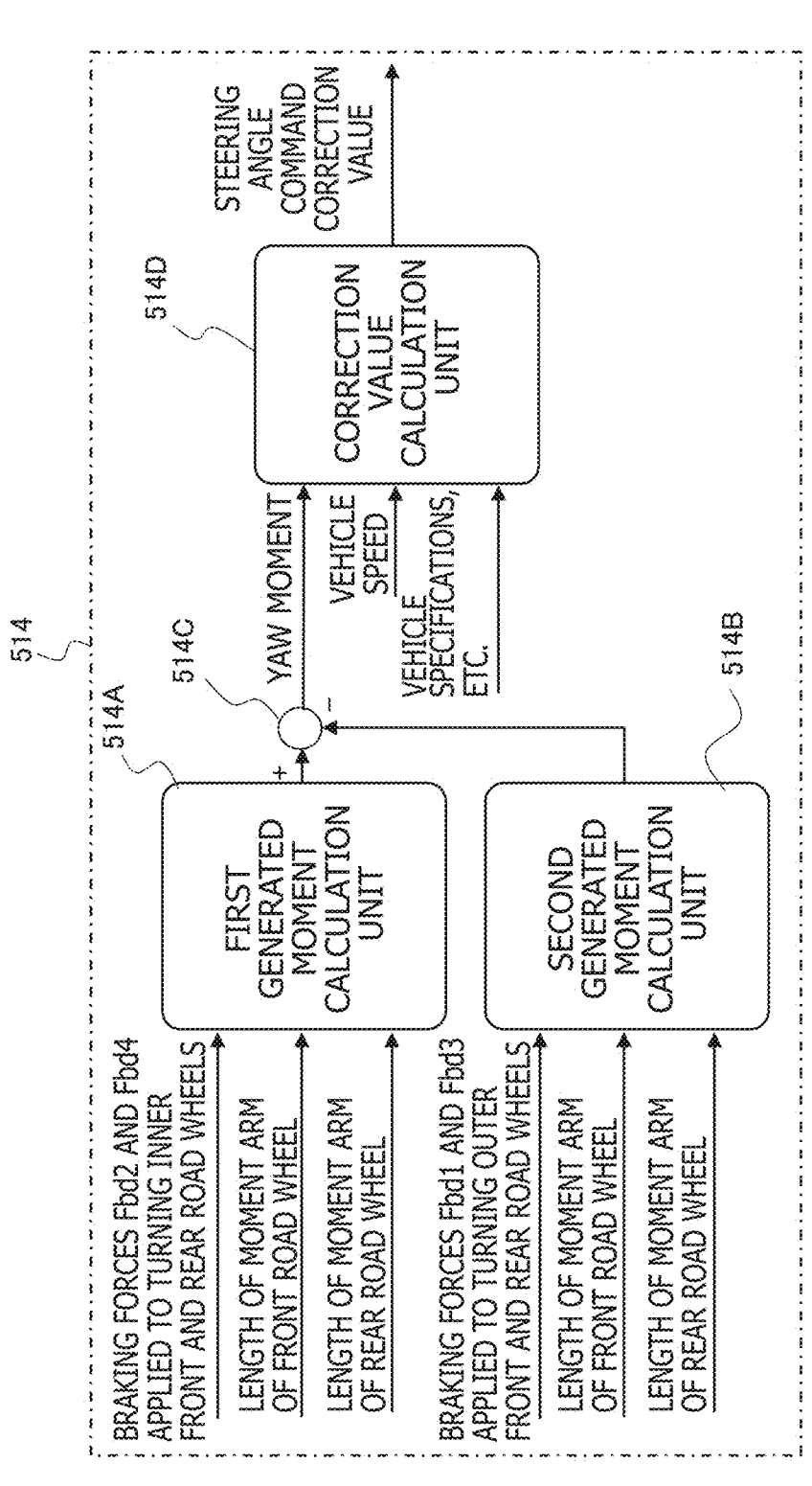
FIG. 11 is a block diagram illustrating functions for correcting a steering angle command based on a yaw moment generated by deceleration braking force allocation control.

FIG. 11 is a functional block diagram illustrating a mode of steering correction unit 514.

Steering correction unit 514 includes various functional units, which are a first generated moment calculation unit 514A, a second generated moment calculation unit 514B, a subtraction unit 514C, and a correction value calculation unit 514D.

First generated moment calculation unit 514A, second generated moment calculation unit 514B, and subtraction unit 514C constitute a yaw moment calculation unit that calculates the yaw moment generated by the deceleration braking force allocation control.

First generated moment calculation unit 514A acquires information about second deceleration braking force Fbd2 applied to the turning inner front road wheel, fourth deceleration braking force Fbd4 applied to the turning inner rear road wheel, the length of the moment arm of the front road wheel, and the length of the moment arm of the rear road wheel, and calculates a first yaw moment toward the turning inside generated by allocated deceleration braking forces Fbd2 and Fbd4.

In addition, second generated moment calculation unit 514B acquires information about first deceleration braking force Fbd1 applied to the turning outer front road wheel, third deceleration braking force Fbd3 applied to the turning outer rear road wheel, the length of the moment arm of the front road wheel, and the length of the moment arm of the rear road wheel, and calculates a second yaw moment toward the turning outside generated by allocated deceleration braking forces Fbd1 and Fbd3.

The subtraction unit 514C acquires information about the first yaw moment calculated by first generated moment calculation unit 514A and information about the second yaw moment calculated by second generated moment calculation unit 514B.

Next, the subtraction unit 514C subtracts the second yaw moment from the first yaw moment, and calculates the yaw moment toward the turning outside generated by allocated deceleration braking forces Fbd1, Fbd2, Fbd3, and Fbd4.

Correction value calculation unit 514D acquires information about the yaw moment calculated by the subtraction unit 514C, information about the speed of vehicle 100, information about the specifications of vehicle 100, etc.

Next, correction value calculation unit 514D calculates a steering control correction value that offsets the yaw moment generated by allocated deceleration braking forces Fbd1, Fbd2, Fbd3, and Fbd4 based on these various kinds of information acquired, and outputs a signal of the calculated correction value to steering device 630.

The steering control correction value calculated by correction value calculation unit 514D is, as described above, a correction value of a command value of the steering angle, a correction value of the steering angle of front road wheels 101 and 102 based on the operation angle of steering wheel 630A, or a correction value of the turning force (steering assist force) by turning actuator 630B, for example.

When vehicle 100 makes a turn with front road wheels 101 and 102 at or approximately at their maximum steering angle, in other words, when vehicle 100 makes a turn at or approximately at its minimum turning radius, steering correction unit 514 cannot increase the steering angle any more. That is, steering correction unit 514 cannot offset the yaw moment generated by the deceleration braking force allocation by increasing the steering angle.

Therefore, when front road wheels 101 and 102 have already been steered to or approximately to the maximum steering angle, that is, when the steering angle exceeds its upper limit value for the allocation control, allocation control unit 513 cancels the execution of the allocation control of allocating greater deceleration braking force to the turning outer front road wheel.

In this way, it is possible to prevent the deceleration braking force allocation control from generating a yaw moment that cannot be offset by the steering correction.

For example, when the vehicle speed is less than a predetermined speed, when the deceleration or acceleration (in other words, the longitudinal acceleration) is a gradual deceleration or acceleration that is less than a predetermined acceleration, or when the lateral acceleration is less than a predetermined lateral acceleration, allocation control unit 513 can cancel the execution of the allocation control of allocating greater deceleration braking force to the turning outer front road wheel.

Allocation control unit 513 can virtually cancel the allocation control by setting allocated quantity ΔFbd2 and allocated quantity ΔFbd3 to zero.

The deceleration braking force allocation pattern executed by the allocation control unit 513 is not limited to the pattern of allocating the deceleration braking force from the turning inner front road wheel and the turning outer rear road wheel to the turning outer front road wheel.

Figure 12:
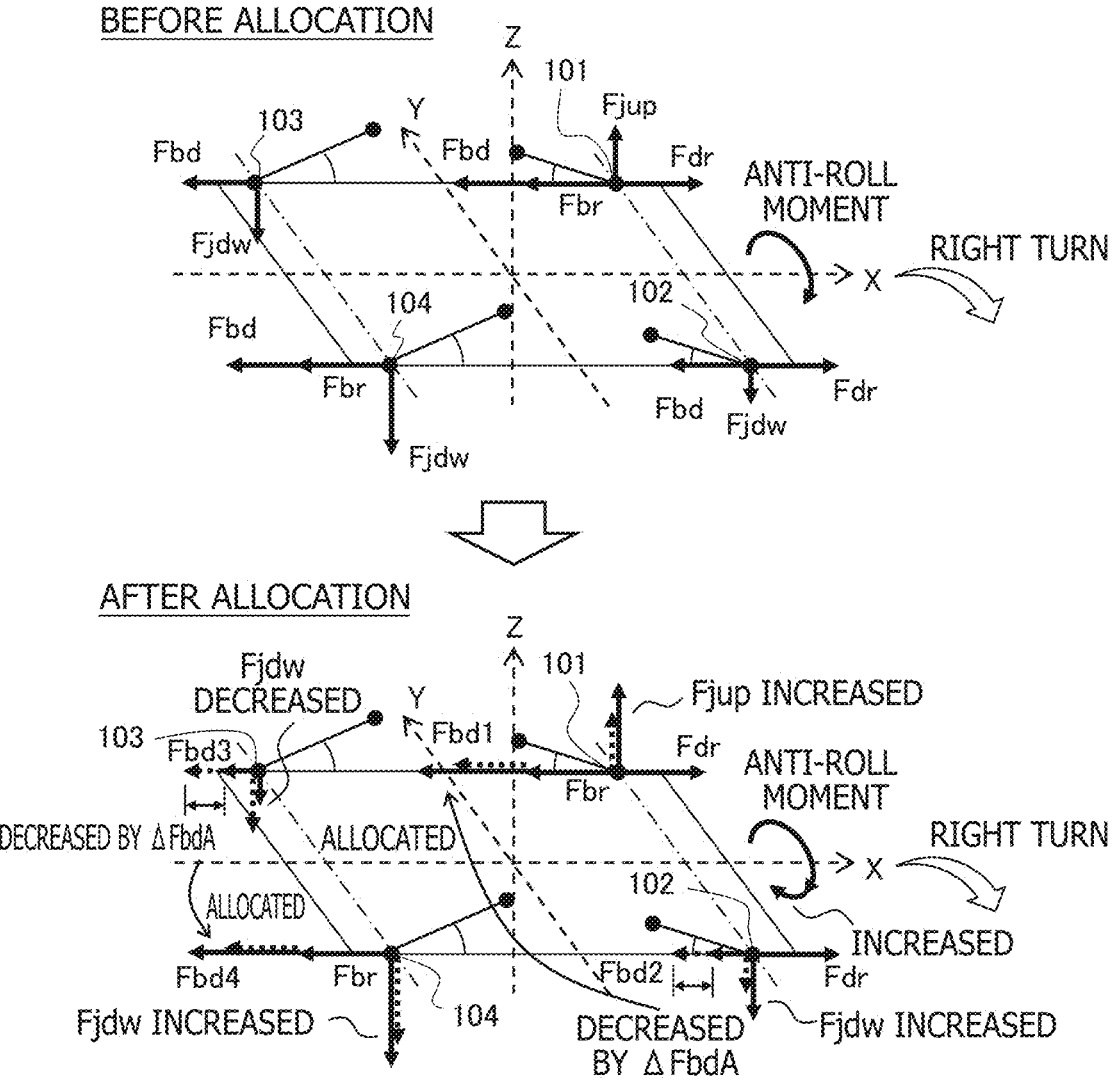
FIG. 12 illustrates a second mode of a deceleration braking force allocation pattern executed during roll control on a front-wheel-drive vehicle turning right.

FIG. 12 illustrates another mode of the deceleration braking force allocation pattern executed by allocation control unit 513.

FIG. 12 illustrates allocation of the deceleration braking force based on a deceleration request when a front-wheel-drive vehicle on which the same roll control as in FIG. 3 is being executed makes a right turn.

In FIG. 12, allocation control unit 513 calculates second deceleration braking force Fbd2 applied to right front road wheel 102, which is the turning inner front road wheel, by subtracting allocated quantity ΔFbdA from deceleration braking force Fbd, which is the equally allocated amount, and calculates first deceleration braking force Fbd1 applied to left front road wheel 101, which is the turning outer front road wheel, by adding allocated quantity ΔFbdA to deceleration braking force Fbd, which is the equally allocated amount.

In addition, allocation control unit 513 calculates third deceleration braking force Fbd3 applied to left rear road wheel 103, which is the turning inner rear road wheel, by subtracting allocated quantity ΔFbdA from deceleration braking force Fbd, which is the equally allocated amount, and calculates fourth deceleration braking force Fbd4 applied to right rear road wheel 104, which is the turning inner rear road wheel, by adding allocated quantity ΔFbdA to deceleration braking force Fbd, which is the equally allocated amount.

That is, by allocating the deceleration braking force corresponding to allocated quantity ΔFbdA from the turning inner front road wheel to the turning outer front road wheel, allocation control unit 513 increases jack-up force Fjup applied to the turning outer front road wheel and increases jack-down force Fjdw applied to the turning inner front road wheel.

In addition, by allocating the deceleration braking force corresponding to allocated quantity ΔFbdA from the turning outer rear road wheel to the turning inner rear road wheel, allocation control unit 513 increases jack-down force Fjdw applied to the turning inner rear road wheel and decreases jack-down force Fjdw applied to the turning outer rear road wheel.

By varying jack-up force Fjup and jack-down force Fjdw as described above, the anti-roll moment is increased, and jack-up force Fjup applied to the turning outer front road wheel is increased. As a result, the dive behavior toward the turning outer front road wheel is reduced.

Allocation control unit 513 sets allocated quantity ΔFbdA based on the lateral acceleration of vehicle 100.

In the allocation pattern in FIG. 12, first deceleration braking force Fbd1 matches fourth deceleration braking force Fbd4, and second deceleration braking force Fbd2 matches third deceleration braking force Fbd3.

Thus, even after the allocation, a sum of first deceleration braking force Fbd1 and third deceleration braking force Fbd3 applied to the turning outside remains the same as a sum of second deceleration braking force Fbd2 and fourth deceleration braking force Fbd4 applied to the turning inside.

Therefore, because the deceleration braking force allocation control in the allocation pattern in FIG. 12 causes no difference in deceleration braking force between the right road wheels and the left road wheels, the deceleration braking force does not generate a yaw moment, and steering correction unit 514 does not need to execute any steering correction.

There are cases in which microcomputer 510 executes control of reducing roll-control driving force Fdr in response to a deceleration request during the roll control. In these cases, in order to satisfy the deceleration request, the deceleration braking force applied to road wheels 101, 102, 103, and 104 can be reduced. In this way, the energy used by vehicle 100 can be reduced.

Figure 13:
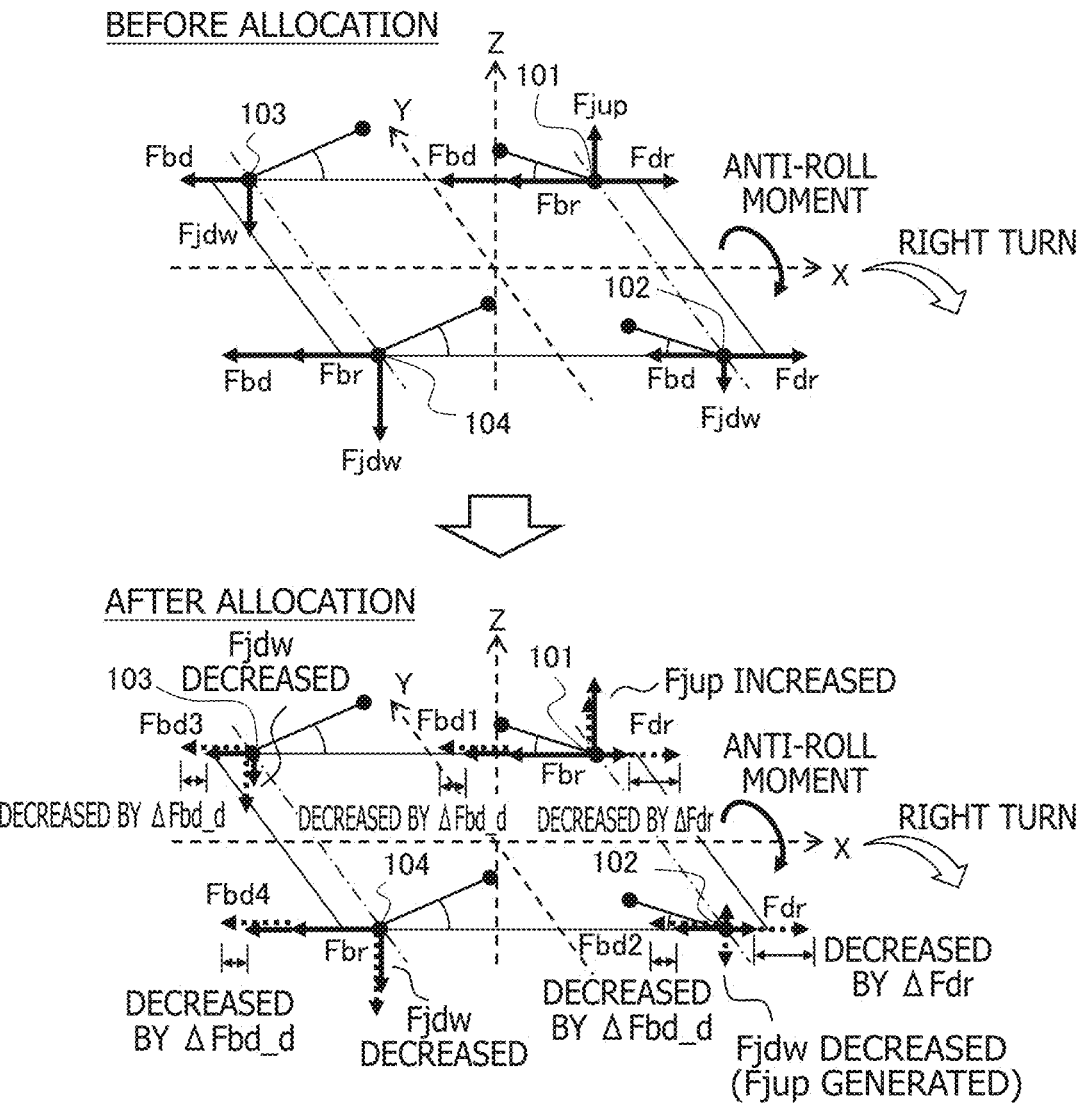
FIG. 13 illustrates a process for reducing roll-control driving force when a deceleration request occurs during roll control on a front-wheel-drive vehicle turning right.

FIG. 13 illustrates allocation control executed when microcomputer 510 receives a deceleration request during the roll control on a front-wheel-drive vehicle turning right. In this allocation control, microcomputer 510 reduces roll-control driving force Fdr by a predetermined amount, and reduces the deceleration braking force by this reduction amount.

The top side in FIG. 13 illustrates a state in which deceleration braking force Fbd is equally allocated to road wheels 101, 102, 103, and 104, without reducing roll-control driving force Fdr.

In contrast, the bottom side in FIG. 13 illustrates a case in which allocation control unit 513 equally reduces roll-control driving force Fdr applied to right and left front road wheels 102 and 101, which are the drive road wheels, and equally reduces deceleration braking force Fbd1, Fbd2, Fbd3, and Fbd4 applied to all the road wheels by the reduction amount of roll-control driving force Fdr.

That is, assuming that the reduction amount of roll-control driving force Fdr is ΔFdr, allocation control unit 513 reduces roll-control driving force Fdr applied to left front road wheel 101 by reduction amount ΔFdr, and reduces roll-control driving force Fdr applied to right front road wheel 102 by reduction amount ΔFdr.

Next, allocation control unit 513 executes an allocation process to reduce deceleration braking force Fbd1, Fbd2, Fbd3, and Fbd4 applied to road wheels 101, 102, 103, and 104, respectively, by allocated quantity ΔFbd_d, which is braking force matching ¼ of reduction amount ΔFdr×2.

In this way, each of allocated first deceleration braking force Fbd1, second deceleration braking force Fbd2, third deceleration braking force Fbd3, and fourth deceleration braking force Fbd4 represents a value obtained by subtracting allocated quantity ΔFbd_d from deceleration braking force Fbd. That is, allocated first deceleration braking force Fbd1, second deceleration braking force Fbd2, third deceleration braking force Fbd3, and fourth deceleration braking force Fbd4 remain the same.

In FIG. 13, roll-control braking force Fbr applied to left front road wheel 101, which is the turning outer front road wheel, is reduced by reduction amount ΔFdr, and first deceleration braking force Fbd1 is reduced by ½ of reduction amount ΔFdr of roll-control braking force Fbr.

Thus, the driving and braking force allocation control substantially increases the braking force applied to left front road wheel 101, which is the turning outer front road wheel. As a result, because jack-up force Fjup increases, the dive behavior toward the turning outer front road wheel is reduced.

Because the allocation pattern in FIG. 13 does not cause a difference in braking force between the right side and the left side of vehicle 100, steering correction unit 514 does not need to execute any steering correction.

The individual technical concepts described in the above-described example can be appropriately combined and used, as long as there is no conflict.

In addition, although the present invention has thus been described in detail with reference to preferred examples, it will be apparent to those skilled in the art that various types of modifications are possible based on the basic technical concepts and teachings of the present invention.

Allocation control unit 513 can selectively execute the allocation control of allocating greater deceleration braking force to the turning outer front road wheel as illustrated in FIG. 6, etc., or the allocation control of equally reducing the deceleration braking force applied to all the road wheels by the reduction amount of roll-control driving force Fdr as illustrated in FIG. 13.

For example, when conditions under which the dive behavior toward the turning outer front road wheel is relatively small (for example, the lateral acceleration and the longitudinal acceleration are small) are met, allocation control unit 513 may execute the allocation control of equally reducing the deceleration braking force applied to all the road wheels by the reduction amount of roll-control driving force Fdr as illustrated in FIG. 13. When these conditions are not met, allocation control unit 513 may execute the allocation control of allocating greater deceleration braking force to the turning outer front road wheel, as illustrated in FIG. 6, etc.

When steering device 630 is a steer-by-wire system, steering correction unit 514 may execute correction control of reducing the steering reaction force applied to steering wheel 630A to a level less than normal.

If the steering reaction force applied to steering wheel 630A is reduced, the driver can easily operate steering wheel 630A in the direction that offsets the yaw moment generated by the deceleration braking force allocation control, that is, in the current tire turning angle. That is, the driver can be assisted in turning steering wheel 630A more.

When steering device 630 includes a rear road wheel steering device for steering rear road wheels 103 and 104 of vehicle 100, steering correction unit 514 can generate the yaw moment toward the turning inside by outputting a control command for the steering angle of the rear road wheels, the control command being output to steer rear road wheels 103 and 104 in the direction opposite to that of front road wheels 101 and 102. In this way, the yaw moment generated by the deceleration braking force allocation control can be offset.

Vehicle control system 200 may include an electronic control device for controlling driving device 610, an electronic control device for controlling braking device 620, and an electronic control device for controlling steering device 630, in addition to vehicle control apparatus 500.

In this vehicle control system, vehicle control apparatus 500 transmits control commands such as the roll-control driving and braking force commands, the deceleration braking force allocation commands, and the steering angle correction commands to these other electronic control devices.

REFERENCE SYMBOL LIST

100 Vehicle
200 Vehicle control system
300 Surrounding area information recognition unit
400 Vehicle motion state acquisition unit
500 Vehicle control apparatus (control unit)
510 Microcomputer (control part)
600 Actuator unit
610 Driving device
620 Braking device
630 Steering device

The invention claimed is:

1. A vehicle control apparatus comprising:
    a control part that acquires various kinds of information including information about motion state of a vehicle, calculates control commands for activating an actuator unit based on the acquired information, and outputs the calculated control commands to the actuator unit, wherein the control part executes roll control on the vehicle based on driving and braking forces applied to road wheels of the vehicle, in the roll control, driving and braking forces are applied to the road wheels without longitudinal acceleration of the vehicle and jack-up force or jack-down force is selectively applied to each of the road wheels to generate an anti-roll moment against the roll moment caused by a turn, and wherein the control part outputs a braking force control command such that first deceleration braking force applied to a turning outer front road wheel of the vehicle becomes greater than second deceleration braking force applied to a turning inner front road wheel of the vehicle and third deceleration braking force applied to a turning outer rear road wheel of the vehicle and becomes equal to or greater than fourth deceleration braking force applied to a turning inner rear road wheel of the vehicle, so as to reduce dive behavior toward the turning outer front road wheel caused by deceleration braking force when a deceleration request is received during the roll control.

2. The vehicle control apparatus according to claim 1, wherein the control part outputs the braking force control command such that the first deceleration braking force becomes greater than the fourth deceleration braking force.

3. The vehicle control apparatus according to claim 2, wherein the control part outputs the braking force control command such that the fourth deceleration braking force becomes greater than the second deceleration braking force and the third deceleration braking force.

4. The vehicle control apparatus according to claim 3, wherein the control part calculates a yaw moment generated by the first deceleration braking force, the second deceleration braking force, the third deceleration braking force, and the fourth deceleration braking force, and wherein the control part corrects a command value of a steering angle of the road wheels, the steering angle of the road wheels based on an operation angle of a steering operation input member, or turning force by a turning actuator for turning the road wheels to increase the steering angle, based on the yaw moment.

5. The vehicle control apparatus according to claim 3, wherein the control part outputs the braking force control command such that the first deceleration braking force increases as longitudinal acceleration of the vehicle and lateral acceleration of the vehicle increase.

6. The vehicle control apparatus according to claim 5, wherein the control part acquires information on a road surface friction coefficient of a traveling road on which the vehicle is running, wherein when the first deceleration braking force is set to exceed a braking force limit value that is set based on the road surface friction coefficient or based on a limit of jack-up lifting a vehicle body of the vehicle, the control part outputs the braking force control command such that the first deceleration braking force is reset to the braking force limit value and such that an excess of the first deceleration braking force set to exceed the braking force limit value is allocated to the fourth deceleration braking force.

7. The vehicle control apparatus according to claim 1, wherein the control part outputs the braking force control command such that the first deceleration braking force matches the fourth deceleration braking force and such that the second deceleration braking force matches the third deceleration braking force.

8. The vehicle control apparatus according to claim 1, wherein when the control part decreases the driving force in the roll control by a predetermined quantity, the control part outputs the braking force control command such that the first deceleration braking force, the second deceleration braking force, the third deceleration braking force, and the fourth deceleration braking force remain a same.

9. The vehicle control apparatus according to claim 1, wherein the roll control applies first roll-control driving force to the turning inner front road wheel, applies first roll-control braking force matching the first roll-control driving force to the turning inner rear road wheel, and applies second roll-control driving force and second roll-control braking force matching the second roll-control driving force to the turning outer front road wheel.

10. The vehicle control apparatus according to claim 1, wherein the roll control applies first roll-control driving force and first roll-control braking force matching the first roll-control driving force to the turning inner rear road wheel, applies second roll-control braking force to the turning outer front road wheel, and applies second roll-control driving force matching the second roll-control braking force to the turning outer rear road wheel.

11. The vehicle control apparatus according to claim 1, wherein the roll control applies first roll-control driving force to the turning inner front road wheel, applies first roll-control braking force matching the first roll-control driving force to the turning inner rear road wheel, applies second roll-control braking force to the turning outer front road wheel, and applies second roll-control driving force matching the second roll-control braking force to the turning outer rear road wheel.

12. A vehicle control method executed by a control unit mounted in a vehicle, the control unit acquiring various kinds of information including information about motion state of a vehicle, calculating control commands for activating an actuator unit based on the acquired information, and outputting the calculated control commands to the actuator unit, the vehicle control method comprising:

executing, by the control unit, roll control on a vehicle based on driving and braking forces applied to road wheels of the vehicle, in the roll control, driving and braking forces are applied to the road wheels without longitudinal acceleration of the vehicle and jack-up force or jack-down force is selectively applied to each of the road wheels to generate an anti-roll moment against the roll moment caused by a turn, and outputting, by the control unit, a braking force control command such that first deceleration braking force applied to a turning outer front road wheel of the vehicle becomes greater than second deceleration braking force applied to a turning inner front road wheel of the vehicle and third deceleration braking force applied to a turning outer rear road wheel of the vehicle and becomes equal to or greater than fourth deceleration braking force applied to a turning inner rear road wheel of the vehicle, so as to reduce dive behavior toward the turning outer front road wheel caused by deceleration braking force when a deceleration request is received during the roll control.

13. A vehicle control system comprising:

a driving unit that applies driving force to road wheels of a vehicle;

a braking unit that applies braking force to the road wheels; and a control part that acquires various kinds of information including information about motion state of a vehicle, calculates control commands for activating an actuator unit based on the acquired information, and outputs the calculated control commands to the driving unit and braking unit, wherein the control part executes roll control in which driving and braking forces are applied to the road wheels without longitudinal acceleration of the vehicle and jack-up force or jack-down force is selectively applied to each of the road wheels to generate an anti-roll moment against the roll moment caused by a turn, and wherein the control part outputs a braking force control command to the braking unit such that first deceleration braking force applied to a turning outer front road wheel of the vehicle becomes greater than second deceleration braking force applied to a turning inner front road wheel of the vehicle and third deceleration braking force applied to a turning outer rear road wheel of the vehicle and becomes equal to or greater than fourth deceleration braking force applied to a turning inner rear road wheel of the vehicle, so as to reduce dive behavior toward the turning outer front road wheel caused by deceleration braking force when a deceleration request is received during the roll control.

* * * * *